United States Patent [19]
Glidden et al.

[11] 3,795,444
[45] Mar. 5, 1974

[54] EXPOSURE CONTROL APPARATUS

[75] Inventors: Dennis James Glidden; Wayne Alan Freiert, both of Rochester, N.Y.

[73] Assignee: Eastman Kodak Company, Rochester, N.Y.

[22] Filed: Oct. 5, 1972

[21] Appl. No.: 295,410

[52] U.S. Cl.................................. 355/68, 355/69
[51] Int. Cl. ........................................ G03b 27/76
[58] Field of Search..... 355/38, 68, 83, 69; 250/205

[56] References Cited
UNITED STATES PATENTS
3,408,142  10/1968  Hunt et al............................ 355/38

Primary Examiner—Fred L. Braun
Assistant Examiner—Richard A. Wintercorn

[57] ABSTRACT

Exposure control apparatus for use in photographic reproduction apparatus such as a microfilmer includes at least one exposure lamp effective when energized to illuminate a document to be photographed when disposed at a photographic station. The apparatus further includes a photocell which receives light directly from the lamp and has a parameter the magnitude of which varies as a function of the level of intensity of such light. An electrical network coupled to the photocell includes (1) an integrator circuit effective in a first condition to produce a signal having a stable amplitude and in a second condition responsive to the magnitude of the parameter to produce a time dependent signal, the amplitude of which is a function of the cumulative total level of radiant energy received from the lamp by the document, (2) a comparator circuit adapted to produce a pulse signal when the time dependent signal reaches a threshold level; (3) an electronic switch such as a relay responsive to the pulse signal to cause the integrator circuit to switch to the first condition and then back to the second condition, and (4) counter means responsive to selected number of such pulse signals for de-energizing the exposure lamps to end document exposure.

1 Claim, 1 Drawing Figure

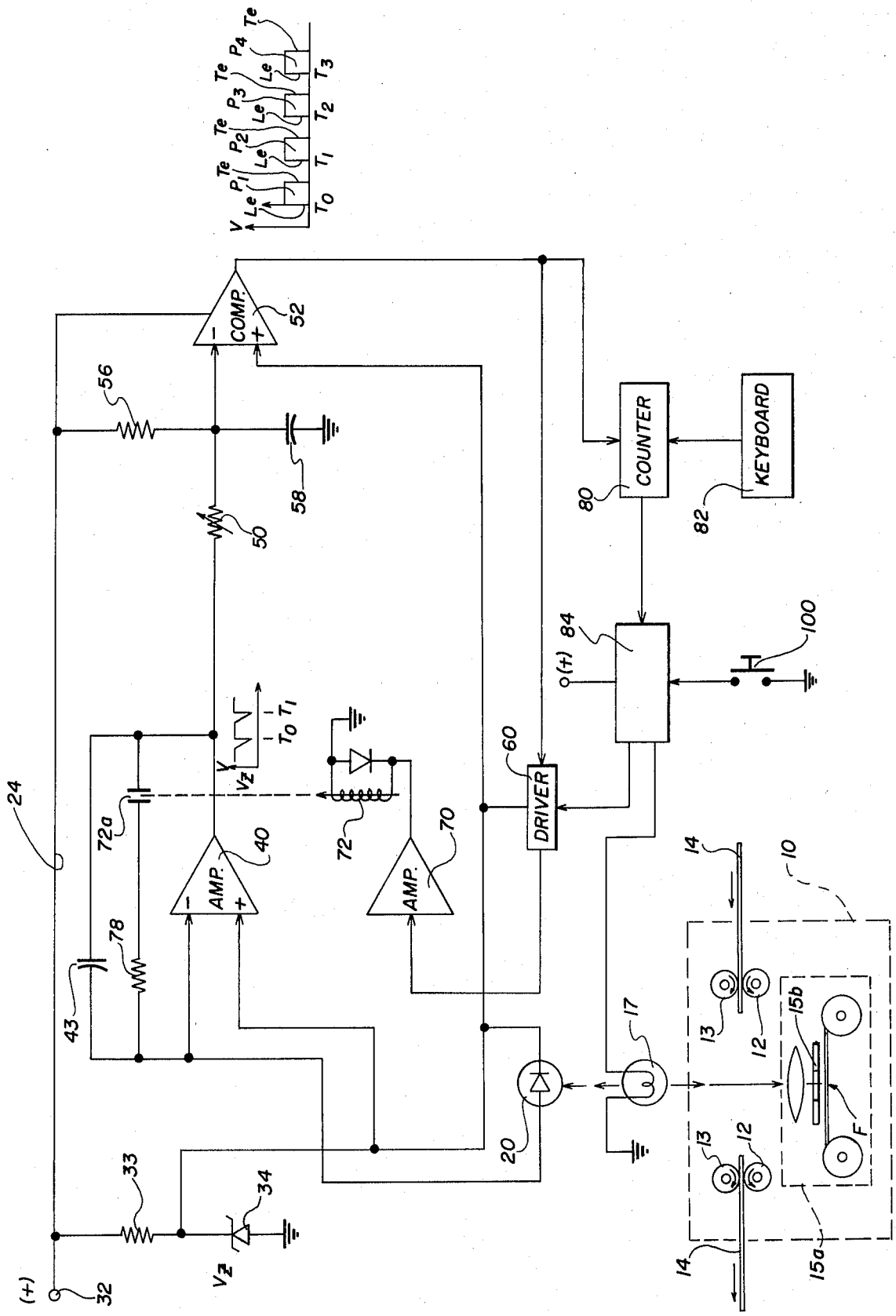

EXPOSURE CONTROL APPARATUS

CROSS REFERENCE TO RELATED APPLICATIONS

Reference is made to commonly assigned copending U. S. Patent Application Ser. No. 261,184 entitled, AUTOMATIC EXPOSURE CONTROL APPARATUS filed June 7, 1972 in the name of Freiert et al.

BACKGROUND OF THE INVENTION

1. Field of the Invention

The present invention relates to exposure control apparatus for use in document reproducing apparatus such as microfilmers.

2. Description of the Prior Art

It is a common practice for exposure control apparatus to maintain exposure time constant but vary the intensity of illumination of exposure lamps as a function of the reflectivity of a document to be reproduced. In microfilming opaque documents such as checks, this type of approach has been found to be quite satisfactory. An example of such an exposure control apparatus is set forth in commonly assigned copending application entitled, "AUTOMATIC EXPOSURE CONTROL APPARATUS," Ser. No. 205,971, filed Dec. 8, 1971 in the name of Dwight Howard. However, in applications where it is desirable to microfilm translucent documents, such as radiographs (which of course includes X-rays of portions of the human body), the reflectivity approach is not always satisfactory since light reflected from a radiograph tends to scatter and the intensity of illumination of the exposure lamp may be improperly adjusted. In a similar approach, U. S. Pat. No. 2,885,563 discloses exposure control apparatus which includes a photocell adapted to receive light from an exposure lamp after passing through a translucent document to be photographed; an integrator circuit coupled to the photocell, the integrator circuit producing a signal the amplitude of which is intended to be a function of the cumulative total radiant energy received by a translucent document; and a trigger circuit adapted to be energized when such signal is at a particular amplitude level. With this apparatus, as with other prior art devices, due to deflection of light by the document, it is difficult for the photocell to produce an accurate output signal representative of the intensity of light illuminating translucent documents.

SUMMARY OF THE INVENTION

It is an object of the invention to provide an improved automatic exposure control apparatus especially suitable for use in microfilming radiographs.

A further object of the invention is to provide automatic exposure control apparatus which adjusts exposure time in response to light impinging directly from exposure lamps without reference to utilize light reflected from and/or passing through documents being photographed.

A still further object of the invention is to provide exposure control apparatus which does not vary the intensity of illumination of exposure lamps but which varies the exposure time such that a selected level of light energy per unit area illuminates a document to be reproduced.

A still further object of this invention is to provide automatic exposure control apparatus which utilizes digital techniques to facilitate adjustment of exposure.

In accordance with the disclosed embodiment of the invention, exposure control apparatus includes at least one exposure lamp effective when energized to illuminate or expose a document to be reproduced at a photographic station; photosensitive means disposed to receive light directly from the exposure lamp and having a parameter the magnitude of which varies as a function of the intensity of the illumination of the exposure lamp. The apparatus further includes an integrator coupled to the photosensitive means and responsive to the magnitude of the parameter of such photosenstive means for producing a time dependent signal which is a function of the cumulative amount of radiant energy per unit area received by the document, means for producing a pulse each time the document receives a selected current of energy, and counter means responsive to a selected number of such pulses for de-energizing the exposure lamp whereby a predetermined cumulative amount of radiant energy will be received by the document during exposure.

The invention and its objects and advantages will become more apparent in the detailed description of the preferred embodiment presented below.

BRIEF DESCRIPTION OF THE DRAWINGS

The above and other objects and advantages of the present invention will become apparent from the following description taken in conjunction with the attached drawing which shows a diagrammatic representation of an exposure control apparatus in accordance with the present invention which includes a circuit diagram partially in schematic and partially in block form and which further includes wave forms which are produced at selected locations in the drawings.

DESCRIPTION OF THE PREFERRED EMBODIMENT

Exposure control apparatus embodying the invention may be employed in continuous or rotary microfilm apparatus such as disclosed in commonly assigned U.S. Pat. No. 2,704,485 entitled, APPARATUS FOR PHOTOGRAPHICALLY COPYING BOTH SIDES OF A DOCUMENT, issued Mar. 22, 1955 in the name of John Egan. The exposure control apparatus embodying the invention, however, is especially suitable for use in apparatus for forming a microfilm reproduction in an aperture card such as disclosed in U.S. Pat. No. 3,423,204 entitled, METHOD OF PROCESSING A PHOTOGRAPHIC FILM INSERT IN AN APERTURE CARD issued Jan. 21, 1969 in the name of Kutchera. In as much as such microfilm apparatus are well known, the present description will be directed in particular to elements forming part of, or cooperating more directly with, apparatus in accordance with the present invention. It will be understood that parts not specifically shown or described are selectable from those known in the art.

Turning now to the drawing, there is shown portions of a microfilmer apparatus 10 which includes a document advancing apparatus shown by continuously driven rollers 12 and 13 which are adapted to operatively engage a document 14 which may be a radiograph and advance such document along a path (shown partially by arrows) to a photographic station 15 for photographic reproduction. The document advancing apparatus may take various forms well known to those skilled in the art.

The photographic station 15 is located adjacent the document path and includes a microfilmer camera 15a and conventional exposure aperture 15b through which actinic light passes to a film F from a bank of exposure lamps shown for the sake of convenience of illustration as a single exposure lamp 17.

Disposed in a selected spaced relationship with respect to the exposure lamp 17 is a photocell 20 which is directly illuminated by light from the lamp 17. The photocell 20 may be a photovoltaic device which "typically is a selenium cell" operated in a current generation mode, (viz., produces current as a function of the level of intensity of incident illumination). Alternatively, the photocell 20 may be a photoresistive device which has a variable resistance parameter. Because the photocell 20 is directly illuminated by lamp 17, the magnitude of its parameter (current) is substantially related only to the intensity of illumination of the lamp and is not influenced by the translucency of the document to be photographed.

The photocell 20 is embodied in a circuit 24 which also includes the exposure lamp 17. The circuit 24 is responsive to the magnitude of the parameter of the photocell 20 (viz., current) and is adapted to adjust the time that the lamp 17 is energized such that the cumulative amount of radiant energy received per unit area of the document disposed at the photographic station 15 is at a selected exposure.

Circuit 24 includes a source of positive potential depicted by a terminal 32, which is coupled to ground through the serial connection of a resistor 33 and a zener diode 34. A relatively stable positive potential denotes Vz in the wave forms (sometimes referred to as the zener reference voltage) is thereby produced at the junction of the resistor 33 and zener diode 34 and is applied to the non-inverting side input terminal of an operational amlifier 40 and other circuit elements described hereinafter. Throughout this specification, whenever the term voltage is used, it will be understood that it will be taken with reference to ground potential. The inverting input of the amplifier 40 is connected to the anode of the photocell 20. The operational amplifier 40 operates as an integrator, and includes a feedback capacitor 43, and produces a time dependent signal, the amplitude of which is a function of the cumulative total radiant energy per unit area received by a document to be photographed from the lamp 17.

The amplifier 40 is effective in two conditions, in the first, a relay contact 72a (to be described more fully hereinafter) is closed and the output of the amplifier 40 is at a zener reference voltage. In the second condition, the contact 72a is open and a ramp-type signal is produced which is a function of the cumulative amount of radiant energy received per unit area by the document.

Depressing exposure switch 100 sets switch 84 and turns on lamp 17. Actuating switch 84 also turns off drive 60 which turns off amplifier 70 thereby allowing relay contacts 72a to open. This starts integrator 40.

The output of the amplifier 40 is directly coupled to a signal level adjusting resistor 50. An operator may be varying the resistance parameter of the resistor 50 adjust or scale to a different degree, the amplitude level of signal of the amplifier 40 to provide a means for adjusting exposure with respect to different translucencies of documents to be photographed. The resistor 50 is directly coupled to the inverting input of the comparator 52. The non-inverting input of the comparator 52 is directly coupled to the electrical junction of the resistor 33 and the zener diode 34. Further, the DC source of potential 32 is coupled to the negative inverting input through a serial connection of the resistor 56 and an AC pass capacitor 58. The amplifier 52 functions as follows. The voltage levels are initially set such that when the level at the inverting terminal is greater than the level at the non-inverting terminal, the signal produced by the comparator 52 is substantially at zero volts. As the integrator 40 produces an output signal it causes a negative ramp to be produced at the input to the inverting terminal of the amplifier 52 and when the voltage at that terminal is substantially reduced to a level (see time To for example of the corresponding wave form) wherein it is equal to the voltage at the non-inverting input, the comparator output switches from a zero low level to a high voltage pulse type signal of say 15 volts. In the comparable wave form there are a series of square pulse signals P1, P2, P3 . . . each of which has a rising leading edge Le and a falling trailing edge Te. At a time when the cumulative level of energy received by the document is at one increment or part of the desired exposure, a pulse P is produced, the leading edge Le of which causes such pulse e to energize a driver circuit 60 which in turn provides a completed circuit path to an amplifier 70 which energizes a relay coil 72. The energized relay coil 72 causes its normally open contacts 72a to close. This action causes the integrating capacitor 43 associated with the amplifier 40 to discharge through a resistor 78 and thereby be in a condition to again commence similar operation. After the internal time delay interval, the driver 60 de-energizes its input to the amplifier 70 and the system is again conditioned for another cycle.

The leading edge Le of each of the pulses P1, P2, . . . is also applied as an input to a counter 80. The counter is of the type which is responsive only to such rising or leading edges Le and is not effected by falling or trailing edge Te. As a second input to the counter, a keyboard 82 provides a selected number of pulses which correspond to desired exposure. In one system, for example, four pulses, or leading edges, when received by the counter would represent a desired nominal exposure, sometimes referred to as zero exposure. In such a system a minus one exposure would have two pulses, a minus two exposure, one pulse, a plus one exposure, eight pulses, a plus two exposure, sixteen pulses. When the counter 80 receives a predetermined number of such pulses, it provides an output to a switch 84. When switch 84 receives a pulse from the counter 80 the voltage to the lamp 17 is interrupted thereby de-energizing the lamp. Driver 60 is turned on and causes relay 72 to energize thereby closing contacts 72a and disenabling integrator 40. Such action, of course, ends exposure.

Summarizing, the exposure control apparatus 10 includes a single photocell device 20 which receives light directly from the exposure lamp 17 and which has a parameter the magnitude of which is a function of the level of intensity of illumination of the lamp 17 and which provides a current input to the operational amplifier 40. The amplifier 40 develops ramp-type signals which when they reach a level VI cause a pulse to be developed, the leading edge of which Le provides a count pulse to the counter 80 and energizes a driver 60. After the driver 60 is energized it causes a relay 72 to energize thereby closing contact 72a which in turn causes the output of the operational amplifier to return to the zener voltage. This action further causes the output of the comparator 52 to fall (see the trailing edge Te to zero volts). The driver then de-energizes the relay 72 and the foregoing operation is repeated. When the selected number of leading edges are applied as inputs to the counter 80, the lamp 17 will be de-energized thereby ending exposure.

The invention has been described in detail with reference to a preferred embodiment thereof, but it will be understood that variations and modifications can be effected within the spirit and scope of the invention.

I claim:

1. In document reproducing apparatus having actuable illumination means for illuminating at least a portion of a document and for exposing a medium at a photographic station to actinic light from such portion to record on such medium a reproduction of said portion, the illumination means being effective when actuated to end document exposure, exposure control means comprising:

a. photosensitive means disposed to receive illumination directly from the illumination means and having a parameter the magnitude of which varies as a function of the intensity of such illumination;

b. integration means coupled to said photosensitive means and effective in a first condition to produce a first signal having a relatively constant amplitude and in a second condition to be responsive to the magnitude of the parameter for producing a second signal having an amplitude which varies from the constant amplitude of said first signal as a function of the cumulative amount of radiant energy received per unit area by the document;

c. means coupled to said integration means and responsive to a predetermined amplitude of said second signal to produce a third signal;

d. switch means resonsive to said third signal to cause said integration means to be effective in said first condition and then after a predetermined interval to be effective in said second condition; and e. counter means responsive to a predetermined number of said third signals for actuating the illuminating means to thereby end document exposure.

\* \* \* \* \*

Disclaimer 3,795,444.—*Dennis James Glidden* and *Wayne Alan Freiert*, Rochester, N.Y. EXPOSURE CONTROL APPARATUS. Patent dated Mar. 5, 1974. Disclaimer filed Mar. 3, 1975, by the assignee, *Eastman Kodak Company*.

Hereby enters this disclaimer to claim 1 of said patent.

[*Official Gazette July 22, 1975.*]